(12) United States Patent
Macy et al.

(10) Patent No.: US 7,391,898 B2
(45) Date of Patent: Jun. 24, 2008

(54) METHOD AND APPARATUS FOR PROGRAMMABLE ZONED ARRAY COUNTER

(75) Inventors: Dale Louis Macy, West Boylston, MA (US); Marek Tomecki, Shrewsbury, MA (US); Jeremiah Collins, Boylston, MA (US)

(73) Assignee: Nova Packaging Systems, Inc., Leominster, MA (US)

(*) Notice: Subject to any disclaimer, the term of this patent is extended or adjusted under 35 U.S.C. 154(b) by 930 days.

(21) Appl. No.: 10/684,047

(22) Filed: Oct. 10, 2003

(65) Prior Publication Data
US 2005/0111724 A1 May 26, 2005

(51) Int. Cl.
*G06K 9/00* (2006.01)
*G06M 1/06* (2006.01)
*A61J 7/02* (2006.01)

(52) U.S. Cl. .................. 382/141; 235/103; 414/675
(58) Field of Classification Search .............. 382/112, 382/141–149, 209, 218; 235/103, 386; 221/123, 221/168, 197, 296; 348/86; 414/675; 700/216, 700/225, 235
See application file for complete search history.

(56) References Cited

U.S. PATENT DOCUMENTS

| | | | |
|---|---|---|---|
| 3,720,815 A | 3/1973 | Downs | |
| 3,753,617 A | 8/1973 | Ehrat | |
| 3,922,532 A | 11/1975 | Kitchener et al. | |
| 4,139,766 A | 2/1979 | Conway | |
| 4,203,029 A | 5/1980 | Kitchener et al. | |
| 4,303,851 A | 12/1981 | Mottier | |
| 4,396,828 A * | 8/1983 | Dino et al. ................. 377/6 |
| 4,408,295 A | 10/1983 | Kavage et al. | |
| 4,634,855 A | 1/1987 | Friend et al. | |
| 4,648,119 A * | 3/1987 | Wingfield et al. .......... 382/243 |
| 4,653,109 A | 3/1987 | Lemelson et al. | |
| 4,730,932 A | 3/1988 | Iga et al. | |
| 5,102,226 A | 4/1992 | Yoshimura et al. | |
| 5,255,331 A * | 10/1993 | Kelly ......................... 382/112 |
| 5,317,645 A | 5/1994 | Perozek et al. | |
| 5,454,016 A | 9/1995 | Holmes | |
| 5,638,417 A * | 6/1997 | Boyer et al. ................. 377/7 |
| 5,675,419 A | 10/1997 | Van Den Bergh et al. | |
| 6,075,605 A | 6/2000 | Futamura et al. | |
| 6,209,788 B1 | 4/2001 | Bridgelall et al. | |
| 6,592,005 B1 * | 7/2003 | Coughlin et al. ........... 221/129 |
| 6,610,973 B1 * | 8/2003 | Davis, III ................. 250/222.1 |
| 6,738,723 B2 * | 5/2004 | Hamilton ................... 702/128 |

OTHER PUBLICATIONS

Skan-A-Matic Model B20 Product Flyer, Jan. 2003.
Dinel Multichannel Sensor for Optical Plastic and Glass Fibres AF Clarys Product Flyer, Jan. 2003.
Romaco Bosspak RTC600 Product Flyer, Jan. 2003.
Romaco Bosspak RTC200 Product Flyer, Jan. 2003.

* cited by examiner

*Primary Examiner*—Daniel Mariam
(74) *Attorney, Agent, or Firm*—Husch Blackwell Sanders LLP

(57) ABSTRACT

The present invention is directed to a system and method for use in a computing environment to provide object counts by utilizing object images. Objects are detected and images are captured using a programmable array of light sources and photo detectors. The images are compared against known images to ascertain the identity of the objects and subsequently count the objects.

19 Claims, 11 Drawing Sheets

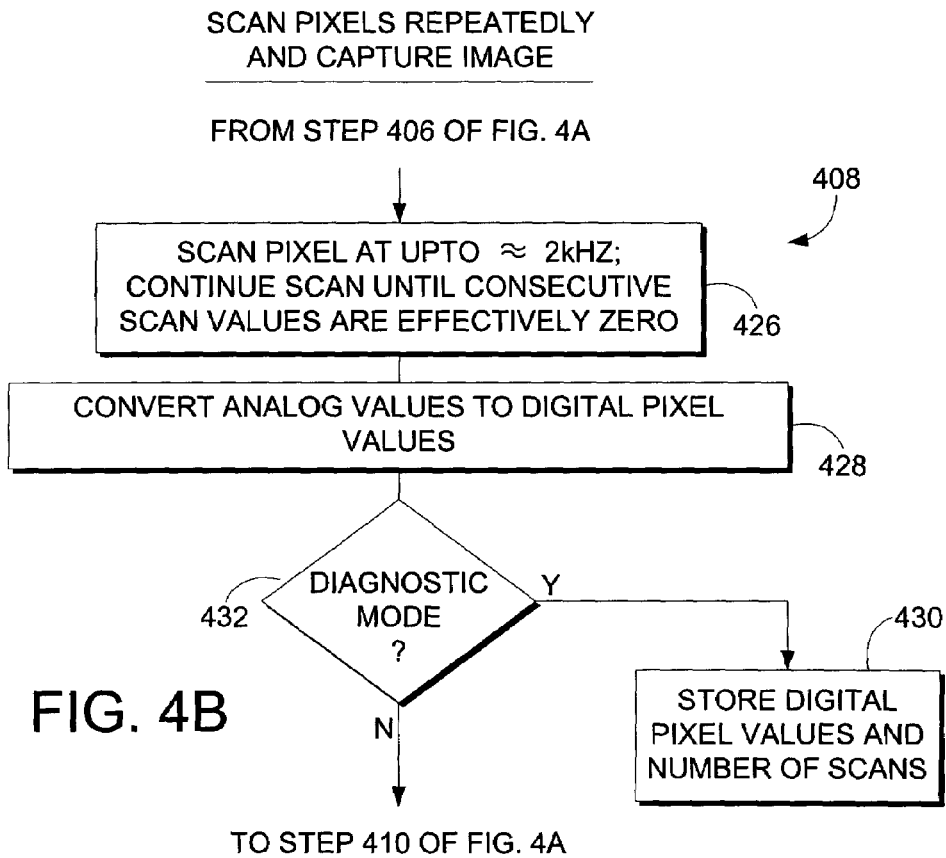
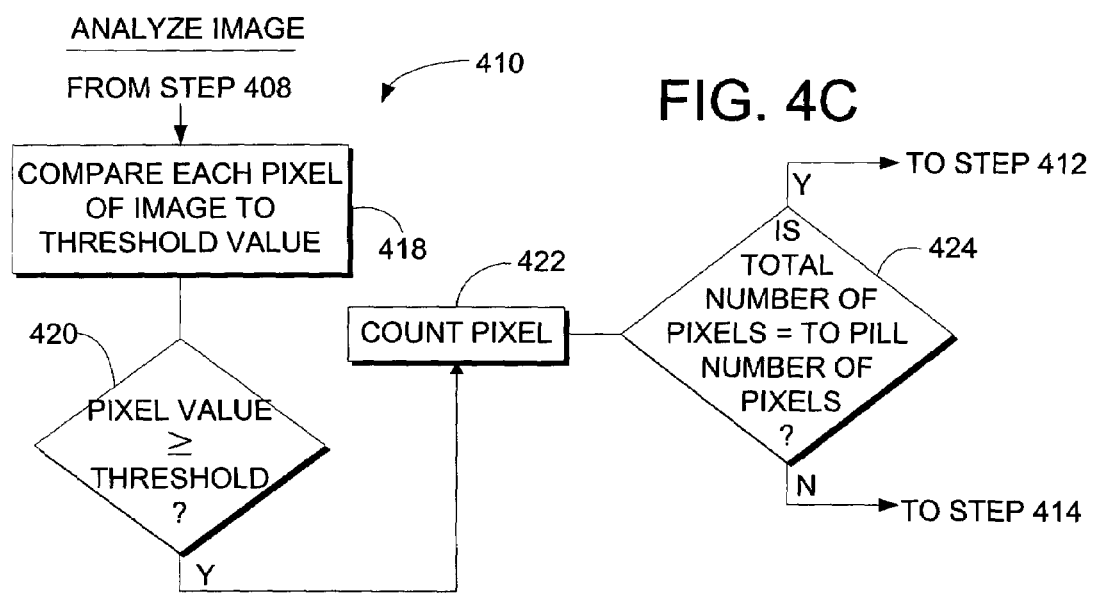

METHOD AND APPARATUS FOR PROGRAMMABLE ZONED ARRAY COUNTER

BACKGROUND OF THE INVENTION

1. Background Art

The present invention relates generally to the field of object detection, evaluation and counting. More particularly, the invention relates to a system and method for detecting the presence of a passing object, providing an image of the object and utilizing the image to identifiably include the object in an overall count.

It is known in the art to utilize light emitting sources and photo detectors to detect the presence of a passing object. For example, in the manufacture of pharmaceutical pills, a dispensing machine known as a slat filler is utilized for filling pill bottles. In order to determine how many pills are fed into a bottle, a number of inspection apparatus have been coupled to or around the slat machine.

Inspection apparatus have typically been optical counters. Some of the optical counters have required a feed system that ensures that the objects, which are to be counted, are presented across a photo detection device in a single file. Further still, such systems have required that the objects are spaced a sufficient distance apart to allow discrete passing of objects between a light source and a sensor. Such system interfere with the packaging process by placing constraints on the feed rates of the pills and requiring mechanical adaptations to the bottle filler. The accuracy of such systems is also an issue with respect to miscounts caused by shadows and other interference. In an attempt to overcome some of these limitations other counting systems were implemented.

For example, in some prior art systems an array of light sensitive elements have been provided to measure by triangulation, individual distances to successively scanned points on the surface of a passing object. Thereby obtaining position data for the scanned points. The position data is then used in relation to a reference plane to provide a profile of the passing object along the scanned points. While the triangulation method improved accuracy and proper detection of an actual object, the problems relating to the bunching of pills and the location of such detection relative to the opening of the bottle remain unresolved.

Other prior art systems have incorporated a bank of at least two linear arrays, which extend in the direction of the reflected light beam. The arrays are positioned such that a light beam from the scanned points can straddle over the linear arrays. By utilizing a scheme of creating definite subdivisions of light receiving elements, the prior art system produces a coded signal that can be readily interpreted by relatively simple circuitry. None the less such systems have required the addition of supplementary hardware to the slat filler machine in the form of pin purge bars. Further still, this and other counting systems have not provided counting of the objects and rather have focused on merely just detection. Even further, these prior art systems have not utilized image captures to identify and count objects.

Accordingly, there exists a need for an improved method and system to provide object counts in manufacturing process, wherein the system is easily configured to suit the dimensions of intended articles of manufacture as well as the manufacturing equipment. Further, there is a need for a system that is able to accurately identify objects that are to be counted and to count the objects.

BRIEF SUMMARY OF INVENTION

The present invention is directed to a system and method for use in a computing environment to provide object counts by utilizing object images. Objects are detected and images are captured using a programmable array of light sources and photo detectors. The images are compared against known images to ascertain the identity of the objects and subsequently count the objects.

In one aspect of the present invention, an optical system for identifying one or more objects comprising a grouping of a light source array and an array of photo detectors into multiple zones is provided. Also provided is a means for rapidly strobing the light source array and scanning the photo detectors within each of the multiple zones to capture a plurality of data values as one or more target objects pass through the zones. Utilizing the data values, an image of the target object is captured. The image is then used to identify the object. Images can also be presented to an operator on a display.

In another aspect of the invention the captured image is used to maintain a count of the identified objects. The image is also used to determine the opacity of the object and thus in certain applications provides information on whether an object is empty.

In a further aspect, the captured images of the falling object are compared with images of know objects through a method that utilizes pixel counts and scan lines. The pixel counts are influenced by the luminance of individual pixels.

In yet another aspect captured images can be stored as part of a diagnostic process. The diagnostic process also allows other data about an object such as, pixel count and scans, to be collected by the system for future use.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 4B is a detailed portion of the pixel scan and image capture step of the flow diagram of FIG. 4A.

FIG. 4C is a detailed portion of the image analysis step of the flow diagram of FIG. 4A.

FIG. 6B is a display of an exemplary screen for specifying threshold values for section pixels in an embodiment of the present invention;

FIG. 6C is an exemplary display screen of zone counts in an embodiment of the present invention;

FIG. 6D is a display screen of invalid zone counts in an embodiment of the present invention;

DETAILED DESCRIPTION OF INVENTION

Figure 1:
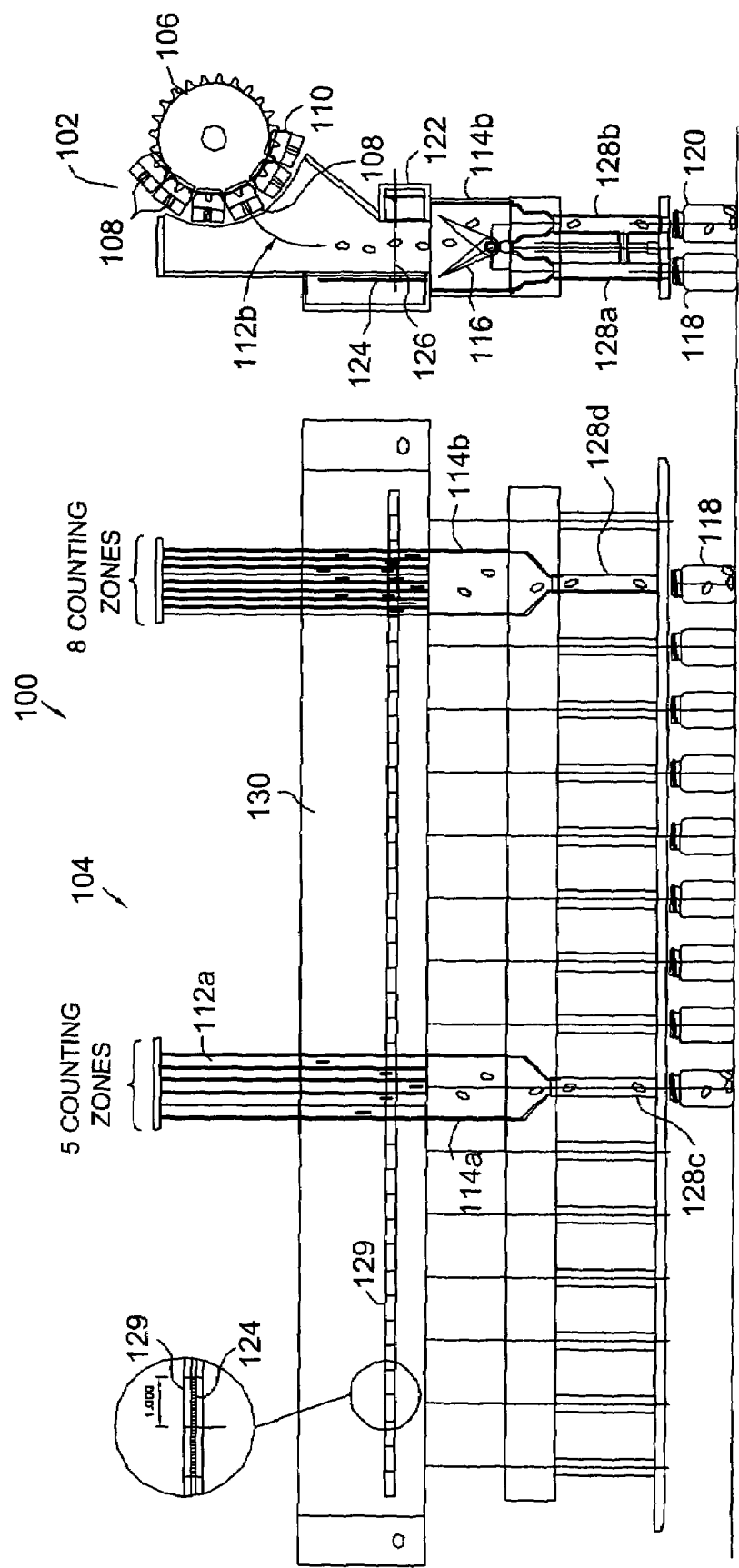
FIG. 1 is an illustration of a slat bottle filler having the zoned array pixel counter of the present invention.

The present invention relates to a system and method for detecting the presence of a passing object, providing an image of the object and utilizing the image to identifiably include the object in an overall count.

According to the embodiment(s) of the present invention, various views are illustrated in FIG. 1-4 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

The present invention detects, evaluates and counts objects as the objects pass a wide area linear scanning device. The scanning device is capable of detecting multiple objects of varying dimensions. The scanning device comprises among other things an array of photo detectors which can be programmatically grouped into zones. The zones can be expanded or shrunk on the basis of the size of the objects that are to be counted. Objects are generally detected through strobing a light source and rapidly scanning zoned detectors to measure the change in light between the source and the photo detectors of the zone. Images of the passing object are created from the scanning process and are utilized in identifying the passing objects. The opacity of passing objects is also determined by the present invention.

Having briefly provided an overview of the present invention, one embodiment of the invention will be discussed with reference to FIGS. 1-6. An exemplary operating environment and architecture for the present invention is first described below.

The details of the invention and various embodiments can be better understood by referring to the figures of the drawing. Referring to FIG. 1, diagrams representative of a typical slat bottle filler implementing a graphical user interface and the system and method of the present invention are shown. The present invention should not be interpreted as having any dependency or requirement relating to any one or combination of components illustrated in the exemplary environment 100.

Referring to FIG. 1, a frontal view 102 and a cross sectional view 104 of the components for counting objects on a slat filling machine generally indicated by the reference number 100 are illustrated. A rotating slat feeder 106 is shown with pills 108 contained in a plurality of cavities 110. In operation, the pills 108 fall from the cavities 110 as the slat feeder 106 rotates. As each pill 108 falls, it proceeds down one of a plurality of product paths 112 into a hopper 114. The illustrated bottle filler is capable of supporting two lanes of bottles for each hopper 114. As such, there is a manifold gate 116 with the hopper 114 to divert the pills to the front lane bottle 118 or the rear lane bottle 120 via the appropriate lower manifold 122a or 122b.

In the preferred embodiment of the present invention, the object counting apparatus is located immediately above the hopper 114, thus allowing the counting to be performed at a location that is closer to the bottle unlike tradition counting systems. Counting closer to the bottle minimizes the chances that pills which have been counted may not end up in the bottle. The object counting apparatus creates a sensing plane 126, between a row of light sources 122 and an opposite row of photo-detectors 124. As illustrated in the view 102, the sensing plane 126 may be substantially perpendicular to the light sources 126 and photo-detectors 124. Irrespective of the relative position of the sensing plane 126, the objective is that pills 108 that fall from the cavities 110, will cross the sensing plane 126.

The sensing plane 126, row of light sources 122 and row of photo-detectors 124 generally extend across a region spanning the longitudinal length of the slat feeder 106. This region is referred to herein as sensing zone 130. In the preferred embodiment of the present invention, the row of photo-detectors 124 forms an array that is approximately forty inches long. The array length is variable and is typically selected to match the dimensions of the slat filler machine.

Within the sensing zone 130 are individually configurable counting zones. There may be sixty to one hundred and twenty counting zones per forty-inch array to match standard slat spacing. However, there are some constraints on the minimum and maximum width for the counting zones. In the preferred embodiment of the invention, a minimum zone width of approximately 0.25 inches and a maximum zone width of approximately 1.0 inches are desirable. Sensing pixels should preferably be spaced approximately every 1/16 of an inch.

Turning to the front view 104, the span of the sensing zone 130 and the relative position of the product paths 112 are illustrated. The sensing zone 130 comprises a continuous array of pixels. In the preferred embodiment, sixteen pixels are positioned in every inch of the forty inch sensing zone 130. The illustrated product paths 112 may vary for each hopper 114. As shown, product paths 112a and 112b are different for each of hoppers 114a and 114b. Also shown in this view, is that the product paths 112 associated with a particular hopper 114 occupy only a portion of the sensing zone 130.

In connection with the product paths 112 there are counting zones 132a and 132b, which are collectively referenced as counting zones 132. For example, counting zones 132a are established in connection with the product paths 112a of hopper 114a. As shown, the hopper 114a has five counting zones 132. On the other hand, hopper 114b has eight counting zones 132. The purpose and significance of the zones will be discussed later in this document.

Figure 2:
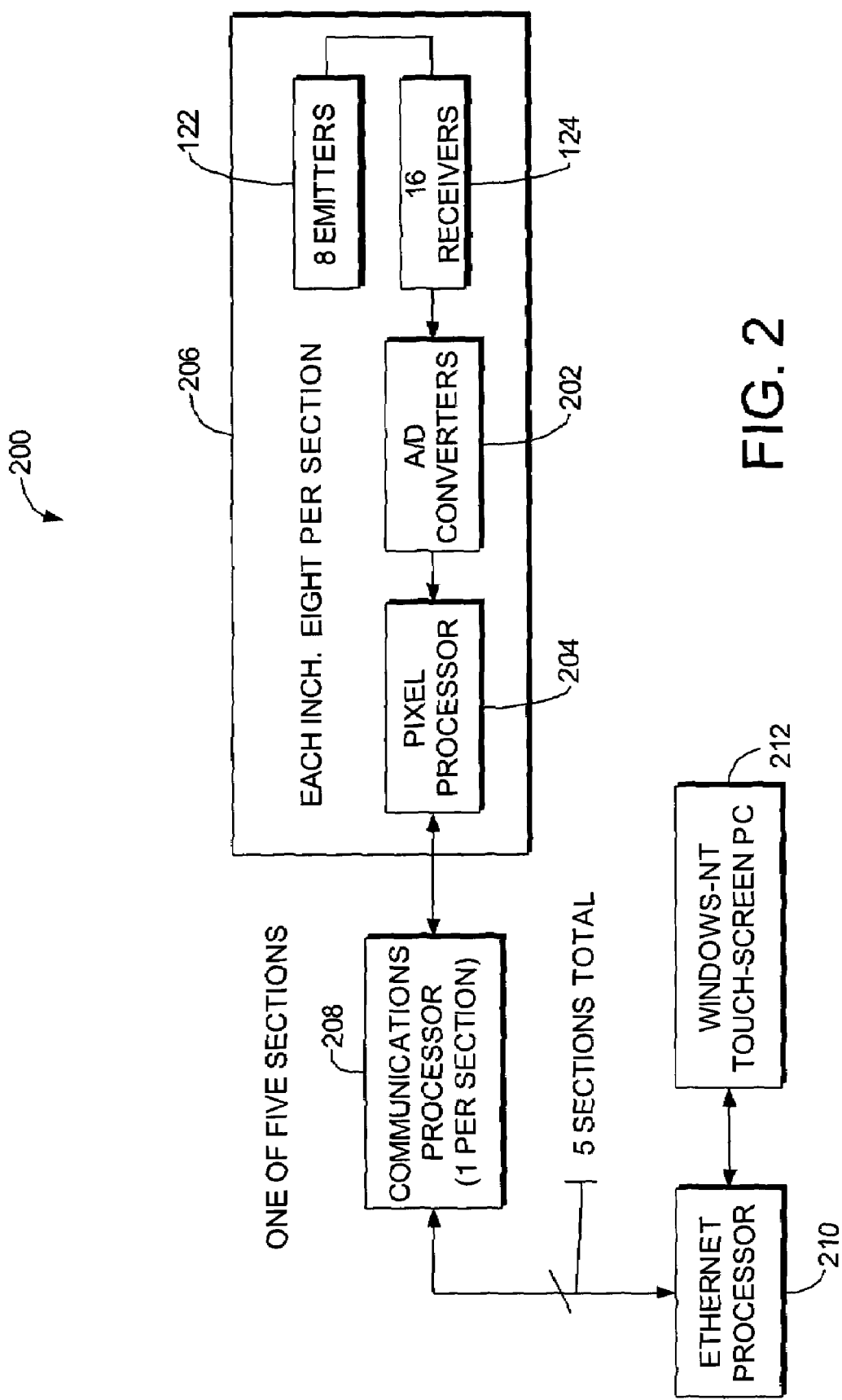
FIG. 2 is a block diagram illustrating the components and architecture for the components of the present invention.

In the preferred embodiment of the present invention, a plurality of LEDs 122 are packaged into an array to serve as a light source for the sensing zone 130. Photo detectors 124 that are one sixteenth of an inch (1/16 inch) in width are packaged into an array and set up to detect light origination from the light source. The arrangement of the light source and detectors is provided to allow readings from the detectors to be taken and utilized in detecting and counting passing objects. FIG. 2 illustrates architecture of the preferred embodiment for capturing and processing the information gathered from the arrangement.

For each inch of photo-detectors there is a group arrangement 206 that comprises a pixel processor 204, Analog-to-Digital (A/D) converters 202, light source 122, and photo detectors 124. In the preferred embodiment of the present invention each of the photo detectors 124 represent pixels. As illustrated, there are sixteen photo detectors or pixels—group detectors 129, within the group arrangement and thus the same for every inch of the scanner. Within the group arrangement 206 there is a pixel processor 204. Light emitted by the light source 122 is detected by the photo detectors 124. When an object falls between the light source and the photo detectors 124, some pixels will be obstructed and thus receive no light, some will be unaffected and yet others may be partially obscured. An analog signal corresponding to the degree of luminescence or darkness is provided by each pixel and passed to the A?D converter 202. Equivalent digital signals of the received analog signals are provided from the A/D converter 202 to the pixel processor 204. The pixel processor 204 performs threshold comparisons of the received values against programmed values to determine the count of pixels that meet the criteria represented by the programmed values. This enables a binary bit to be set for each bit. Sixteen bits, each representing a pixel are presented to a section communication processor 208.

A collection of eight group arrangements 206 are preferably combined into a section. In other words, a section would have 128 pixels (8*16 pixels per inch). For each section there is a communications processor 208. The communications processor 208 communicates with the pixel processors 204 via a high speed Integrated Circuit (IC) bus connection, which is local to the section board.

The communication processor 208 receives 16 bits of pixel states from each of eight pixel processors 204 in the section. The communication processor 208 determines which counting zone 132 the pixel is accumulated into and accumulates the blocked pixels that meet threshold and the total numbers of scans performed for that zone. The scans and pixel counts are ultimately transmitted via an interface card such as Ethernet processor 210, to a personal computing device 212. At the personal computing device 212 the received data packets containing information on scans, pixel counts, and zone data may be displayed or otherwise processed.

Figure 3:
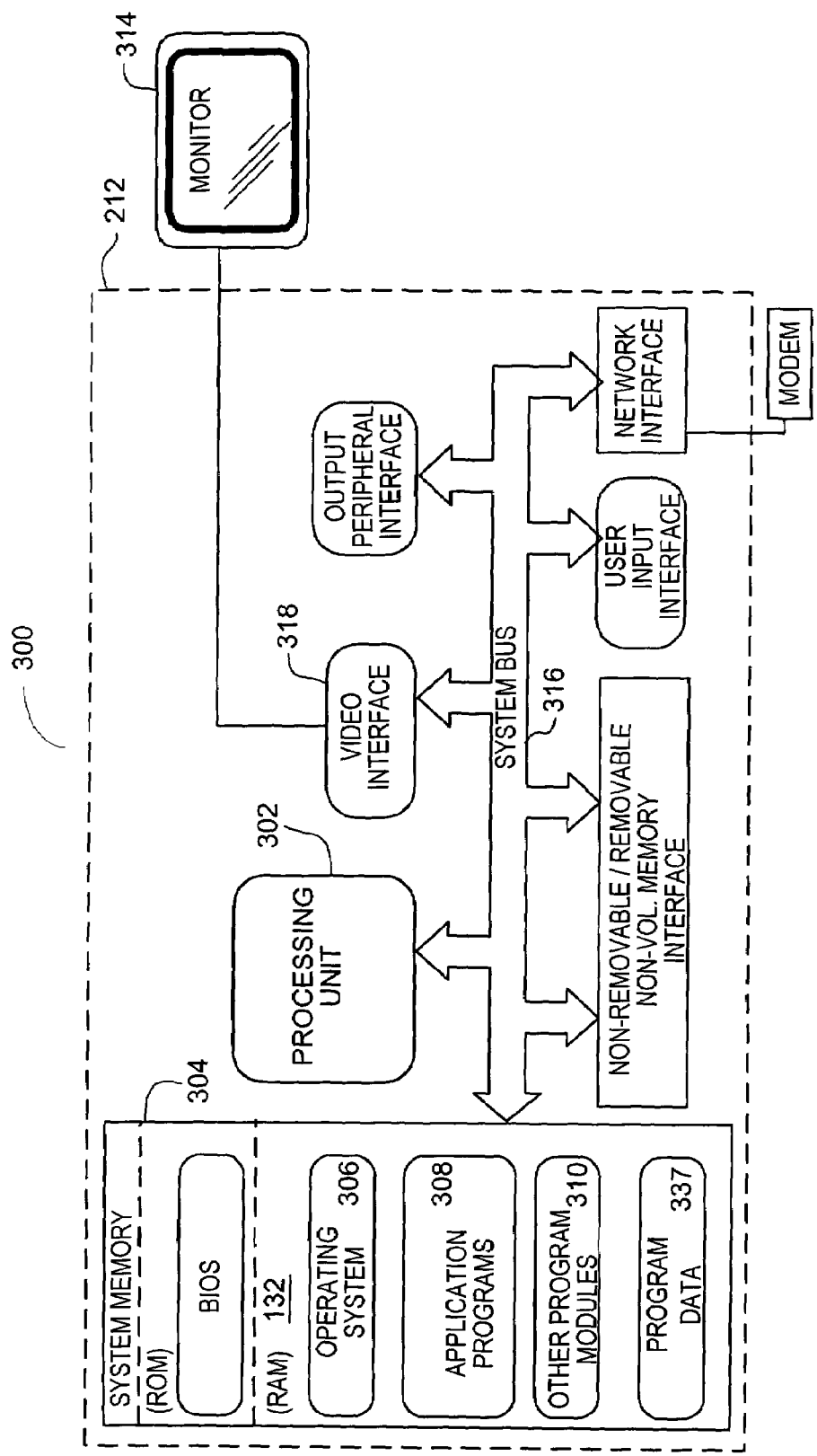
FIG. 3 is a block diagram of an exemplary operating environment for practicing the present invention.

An exemplary personal computing device 212 for performing certain features of the present invention is presented in FIG. 3. The computing system device 212 is only one example of a suitable computing environment and is not intended to suggest any limitation as to the scope of use or functionality of the invention.

In that regard, the present invention may be described in the general context of computer-executable instructions, such as program modules, being executed by a computer or processing device. Generally, program modules include routines, programs, objects, components, data structures, etc. that perform particular tasks or implement particular abstract data types. Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. When operating in a distributed computing environment, program modules may be located in both local and remote computer storage media including other memory storage devices. Additionally, various functions that will be described herein may be implemented by modules that exist wholly or partially on a client system or a server.

FIG. 3 illustrates an example of a suitable computing system environment 300 on which the invention may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

With reference to FIG. 3, an exemplary system 300 for implementing the invention includes a general purpose computing device in the form of a computer 212 including a processing unit 302, a system memory 304, and a system bus 316 that couples various system components including the system memory to the processing unit. Importantly, the variant of the computer 212 utilized as the client PC must support a playback mechanism and data rates suitable for high end image rendering.

Computer 212 typically includes a variety of computer readable media, which may comprise computer storage media and communication media. The system memory includes computer storage media in the form of volatile and/or nonvolatile memory such as read only memory (ROM) and random access memory (RAM). A basic input/output system (BIOS), containing the basic routines that help to transfer information between elements within computer 212, such as during start-up, is typically stored in ROM. RAM typically contains data and/or program modules that are immediately accessible to and/or presently being operated on by processing unit 302. For illustrative purposes, FIG. 3 depicts operating system 306, application programs 308, other program modules 310, and program data 312.

The computer 212 may also include other removable/non-removable, volatile/nonvolatile computer storage media. Such removable/non-removable, volatile/nonvolatile media may include a hard disk drive, a magnetic disk drive, an optical disk drive, a CD ROM or other optical media. Other removable/non-removable, volatile/nonvolatile computer storage media that can be utilized include, but are not limited to, magnetic tape cassettes, flash memory cards, digital versatile disks, digital video tape, solid state RAM, solid state ROM, and the like.

The drives and their associated computer storage media discussed above and illustrated in FIG. 3, provide storage of computer readable instructions, data structures, program modules and other data for the computer 212. A user may enter commands and information into the computer 212 through input devices such as a keyboard, pointing device or scripting interface. Other input devices may include a microphone, joystick, game pad, satellite dish, scanner, or the like. These and other input devices may be connected by other interface and bus structures, such as a parallel port, game port or a universal serial bus (USB). A monitor 314 or other type of display device is also connected to the system bus 316 via an interface, such as a video interface 318. In addition to the monitor 314, computers may also include other peripheral output devices such as speakers, and printers, which may be connected through a output peripheral interface.

The computer 212 in the present invention will operate in a networked environment using logical connections to one or more remote computers. The remote computer may be a personal computer, and typically includes many or all of the elements described above relative to the computer 212. The logical connections depicted in FIG. 3 include a local area network (LAN) and a wide area network (WAN), but may also include other networks.

When used in a LAN networking environment, the computer 212 is connected to the LAN through a network interface or adapter. When used in a WAN networking environment, the computer 212 typically includes a modem or other means for establishing communications over the WAN, such as the Internet. In a networked environment, program modules depicted relative to the computer 212, or portions thereof, may be stored in the remote memory storage device. It will be appreciated that the network connections shown are exemplary and other means of establishing a communications link between the computers may be used.

Although many other internal components of the computer 212 are not shown, those of ordinary skill in the art will appreciate that such components and the interconnection are well known. Accordingly, additional details concerning the internal construction of the computer 212 need not be disclosed in connection with the present invention.

Having provided a broad overview and introduced the environment, devices and nomenclature, the process of the present invention can better be understood and will be discussed with reference to flow diagrams and screen illustrations in FIGS. 4-6.

Figure 4A:
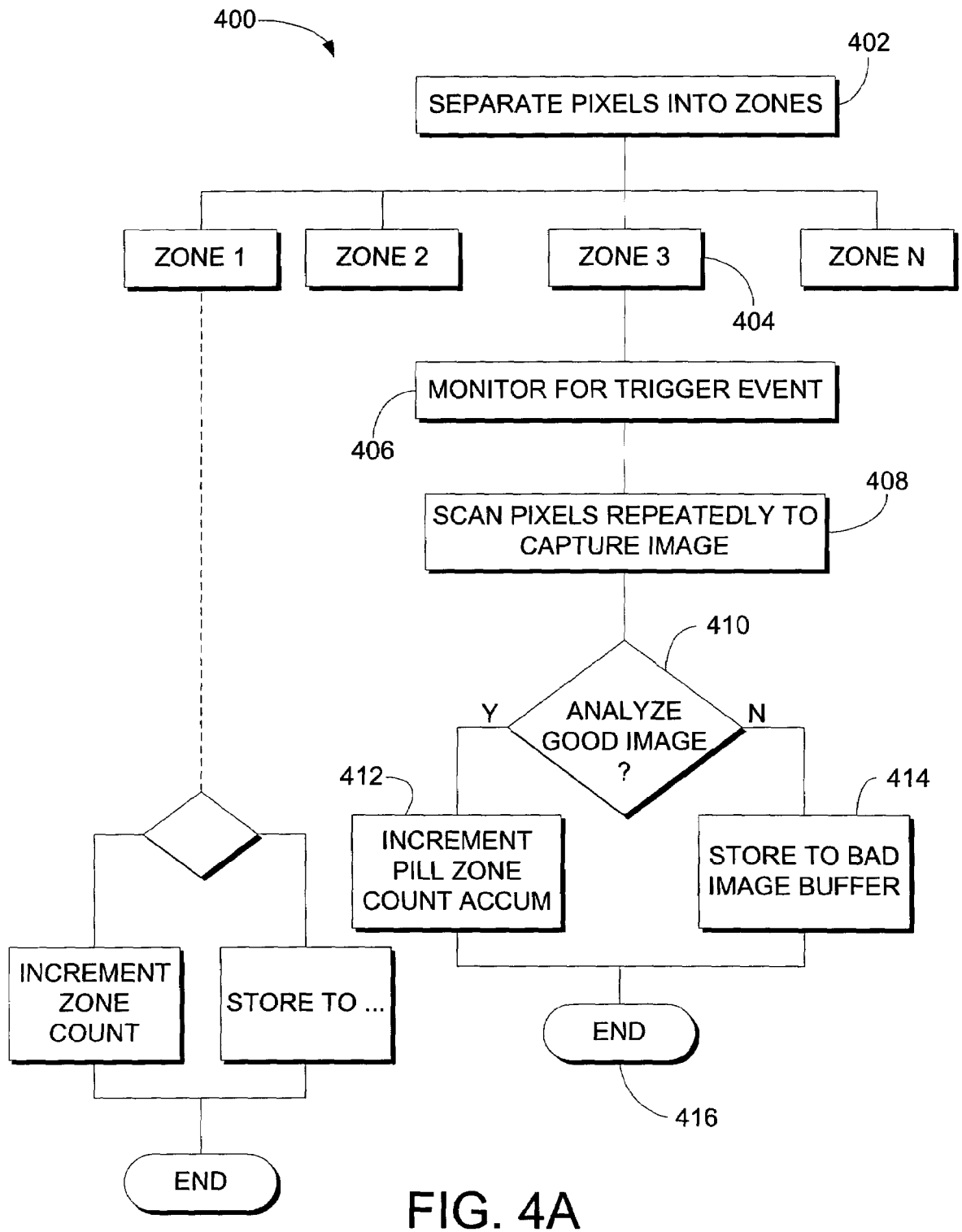
FIG. 4A is a flow diagram illustrating the process implement by the system and method of the present invention.
Figure 5:
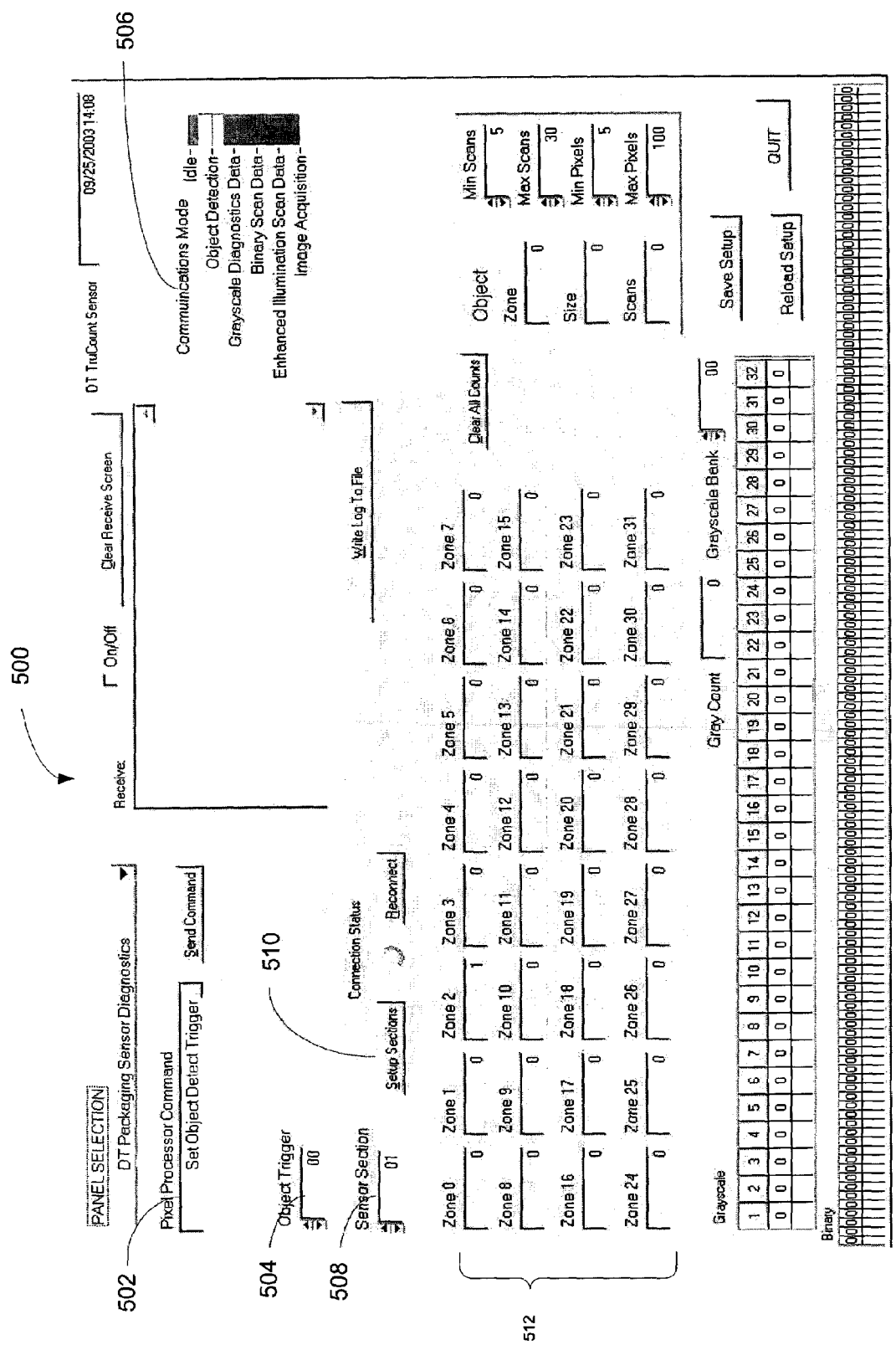
FIG. 5 is a display of an exemplary screen for providing system diagnostics and setup parameters.

Turning initially to FIG. 4A, a process flow diagram of the present invention is illustrated. As shown and as described earlier, pixels representative of photo-detectors 124 are first grouped into sections and ultimately into zones, at step 402. In the preferred embodiment, zones of pixels are defined to coincide with product paths. In other words, a zone is a vision area between physical pill dividers. Pixels that are located in front of the dividers are unused by the system. These pixels are assigned to a set-aside zone number 32 (20 Hex). Aside from this, any of the 128 pixels in a section may be mapped to any of up to 32 other zones identified as Zone 0 through Zone 31. This option is illustrated at step 404. Zones may be mapped as shown in FIG. 6A.

Figure 6A:
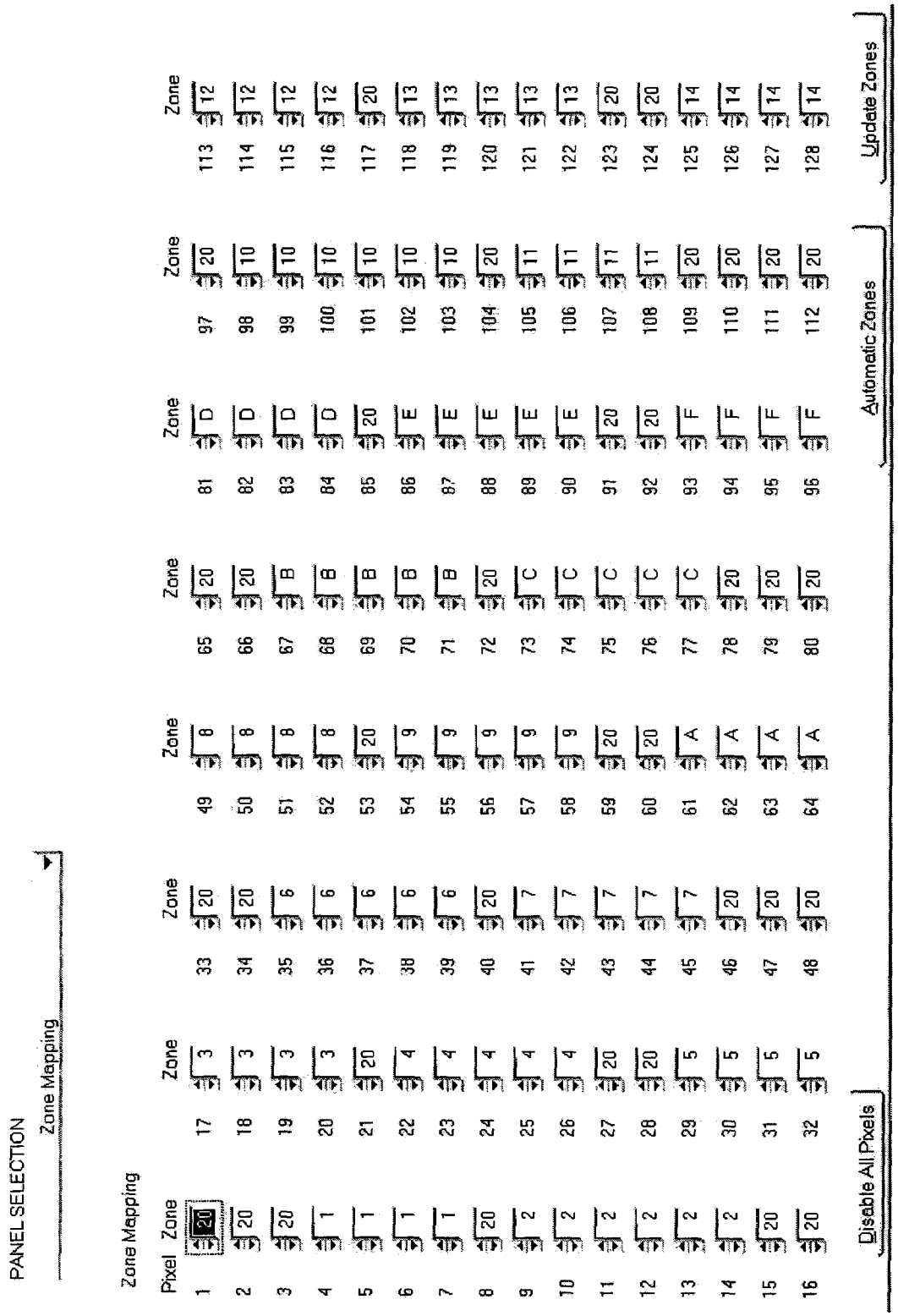
FIG. 6A is a display of an exemplary screen for mapping zones in an embodiment of the present invention.

FIG. 6A illustrates a zone mapping screen display 600. As shown, mapping screen 600 provides a user with the ability to assign any one of the 128 pixels of a currently selected section, to a particular Zone. In this embodiment, the zone mapping numbers are designated in hexadecimal i.e. 0-31 are represented as 0-1F. Zone 32 (20 Hexadecimal) is reserved for the unused or otherwise obstructed pixels. The table below illustrates the zone configuration defined for the first sixteen pixels in the section of display 600.

| Pixel | 1  | 2  | 3  | 4 | 5 | 6 | 7 | 8  | 9 | 10 | 11 | 12 | 13 | 14 | 15 | 16 |
|-------|----|----|----|---|---|---|---|----|---|----|----|----|----|----|----|----|
| Zone  | 20 | 20 | 20 | 1 | 1 | 1 | 1 | 20 | 2 | 2  | 2  | 2  | 2  | 2  | 20 | 20 |

Assigning a pixel to Zone 20 Hex effectively turns the pixel off. The pixel is unused typically because a pill divider covers the pixel either fully of partially. Such a pixel need to be excluded from the processing that takes place. For example, the illustrated pixels 1, 2, 3, 8, 15 and 16 shown in table above and on screen 600 would be ignored during any scan of the affected zones. Pixels 4, 5, and 6 would be accumulated to form an image for pills dropping in Zone #1. Pixels 9-14 would likewise be accumulated for pills dropping in Zone #2. All pixels are effectively mapped to a Zone # as shown in display 600.

Returning to FIG. 4A, at step 406, the system monitors for a triggering event within the zone. It should be understood that step 406 and the subsequent steps are performed for each of the zones 1 to N that are configured. In response to the triggering event, the pixels within each zone are repeatedly scanned, at step 408. The scanning allows the pixels to be evaluated and an image of the falling object to be captured. The scanning and capture processes are illustrated in FIG. 4B.

FIG. 4B illustrates step 408 in a flow diagram 425, i.e. the process for repeated scanning and image capture. As shown, at step 426, the pixels of a particular zone are scanned at a frequency rate of up to approximately 2 kHz. The light source is strobed synchronously with the scanning of the photo detectors. The scanning continues until a succession of scans, preferably four scans result in readings that indicate no obstruction of the light that is incident on the detectors. Each scan results in an analog value for each of the pixels in the zone. At step 428, the analog values are converted to a digital pixel value. If the system is operating in a diagnostic mode as determined at step 432, then the pixel values are stored for later use, at step 430. On the other hand, if the system is operating in the normal counting mode, the process continues to step 410 of FIG. 4A.

Step 410 involves an analysis of whether or not the scanned pixels represent a 'good image'. That is, do the pixels meet the criteria of what is determined a good detection. Further details on how this is accomplished are illustrated in FIG. 4C.

FIG. 4C illustrates in a flow diagram the process of step 410 i.e. the process for analyzing images. As pills fall through a zone, they obstruct light from an emitter 122 that is incident on some or all of the pixels of the photo-detectors 124 that are defined within that zone. During each scan of all the pixels in a zone, a quantitative value representing the degree of darkness or light incident on a pixel is obtained. Since reflections, shadows and other such phenomenon may interfere with the luminance of a pixel, certain thresholds are established. Each pixel in each of the five sections of the sensing zone has an associated high and low threshold value. The pixel processors 204 consider a pixel to be blocked if the pixel's light value exceeds the high threshold. The scanned valued for each pixel is compared against the threshold value, at step 418. The threshold values are provided prior to the scanning operation.

Figure 6B:
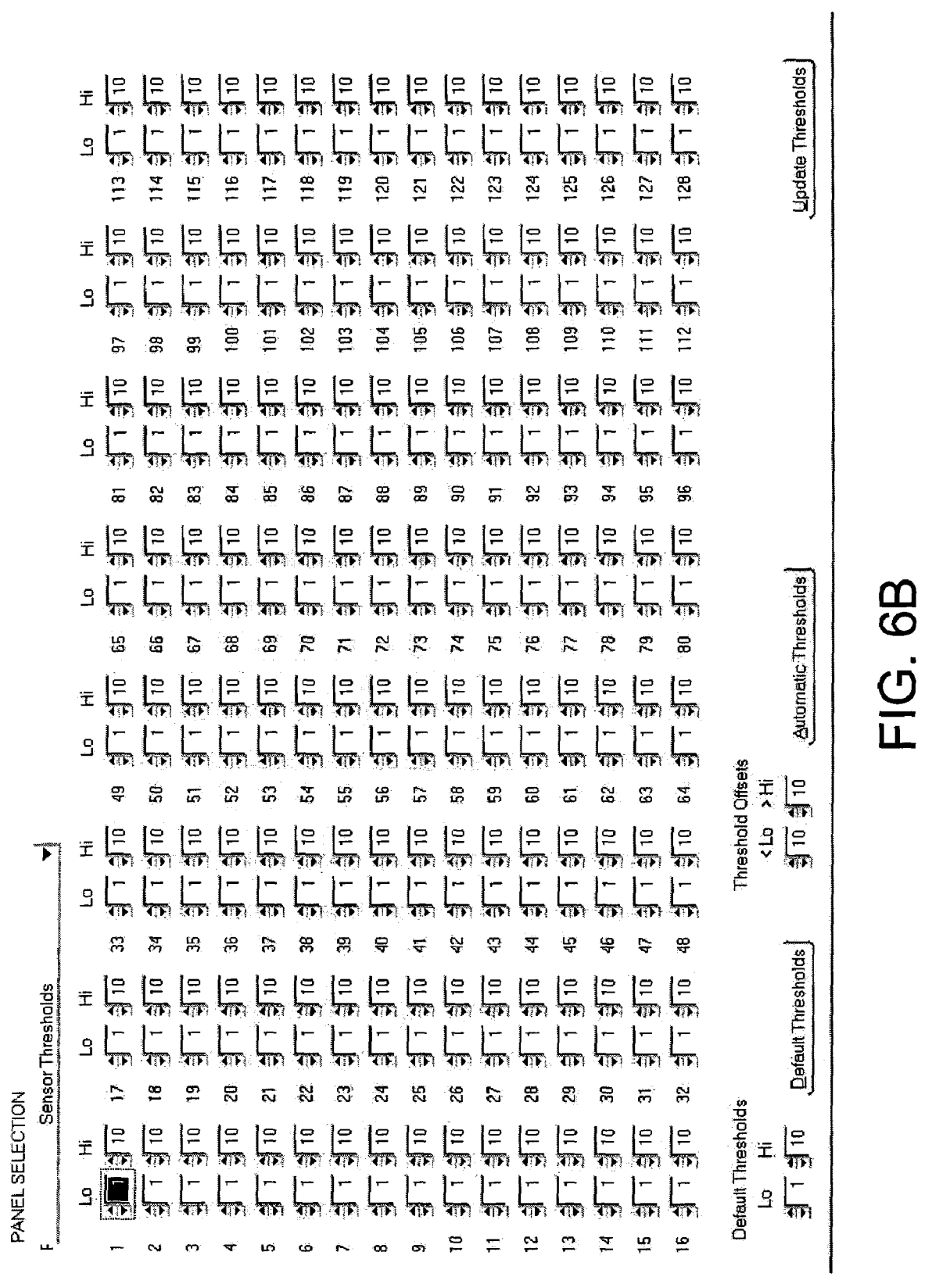

Turning to FIG. 6B, a screen is displayed wherein threshold values for each of the one hundred twenty eight pixels within a section can be specified. In an embodiment of the present invention, an option is provided to enable a user to set a default threshold value for all pixels. While both a low and high threshold can be specified, the preferred embodiment utilizes just the high threshold value.

At step 420, the determination is made regarding whether the pixel value exceeds the threshold value. If the pixel value does not exceed the threshold value, then that pixel is ignored for purposes of pixel counts. Conversely, if the pixel value exceeds the threshold value, then the pixel is counted and included in the overall pixel count for the falling object. The accumulated pixel counts are stored by individual zone counters. The accumulated pixel count for the falling object is compared to a previously determined count of pixels for the anticipated object or in this case, the pill that is being bottled. As would be understood by one skilled in the art, such a comparison involves performing some statistics on the various values and taking into account certain degrees of deviation. If it is determined that there is a match within the acceptable deviation limits, processing continues to step 412 of FIG. 4A. On the other hand, if there is no match, processing continues to step 414 of FIG. 4A.

Figure 6C:
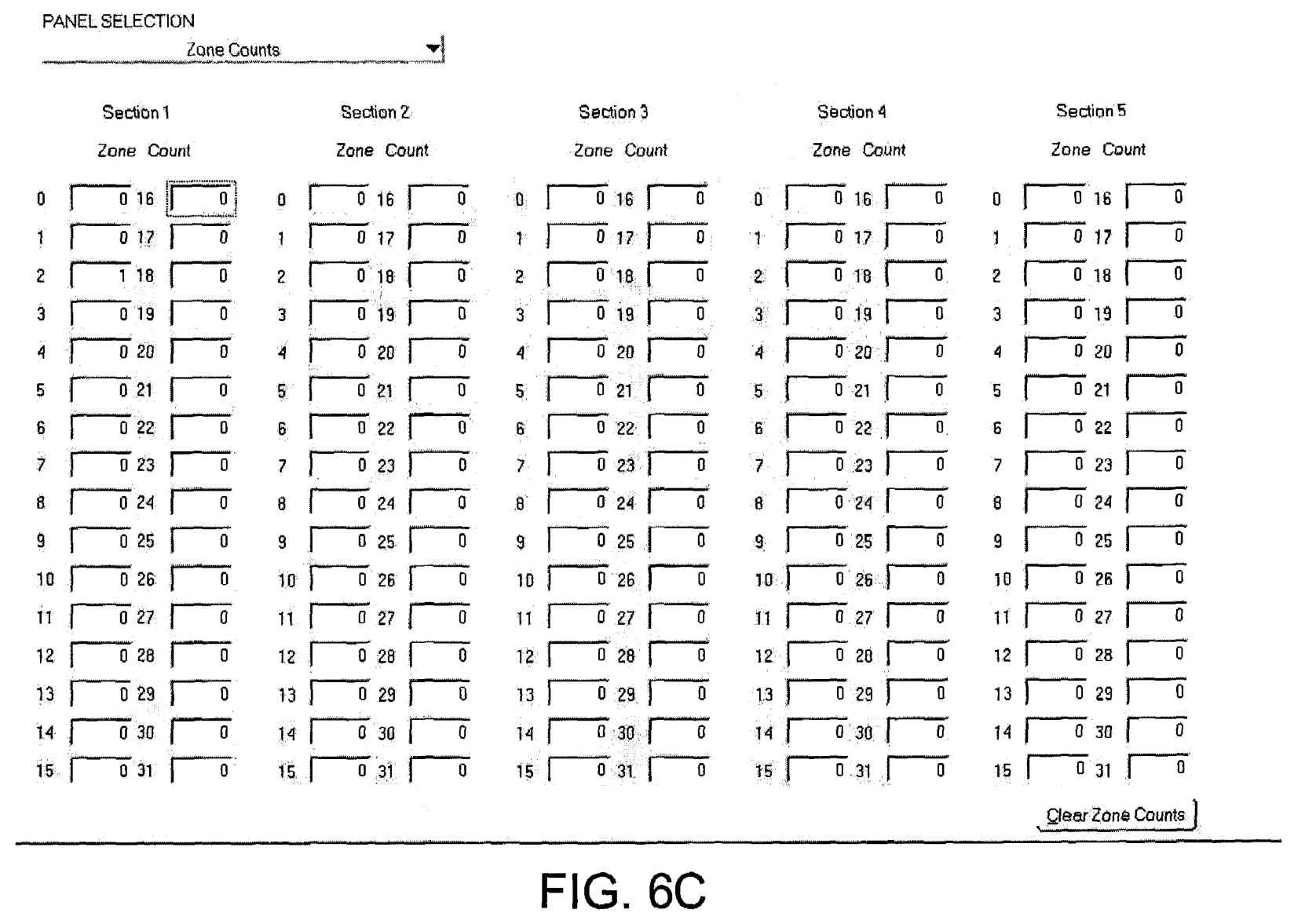

If the object image is determined to be 'valid' i.e. it is recognized as a pill by step 410, then an accumulator value of pill counts is incremented, at step 412. A valid pill is defined as a pill whose pixel counts and pixel scans fall with a predetermined valid range, as defined to the system. Qualification values are specified to the system as maximum/minimum scans and maximum/minimum pixel. A screen illustrating valid counts for each zone within each section is shown in FIG. 6C and referenced as display 604.

Figure 6D:
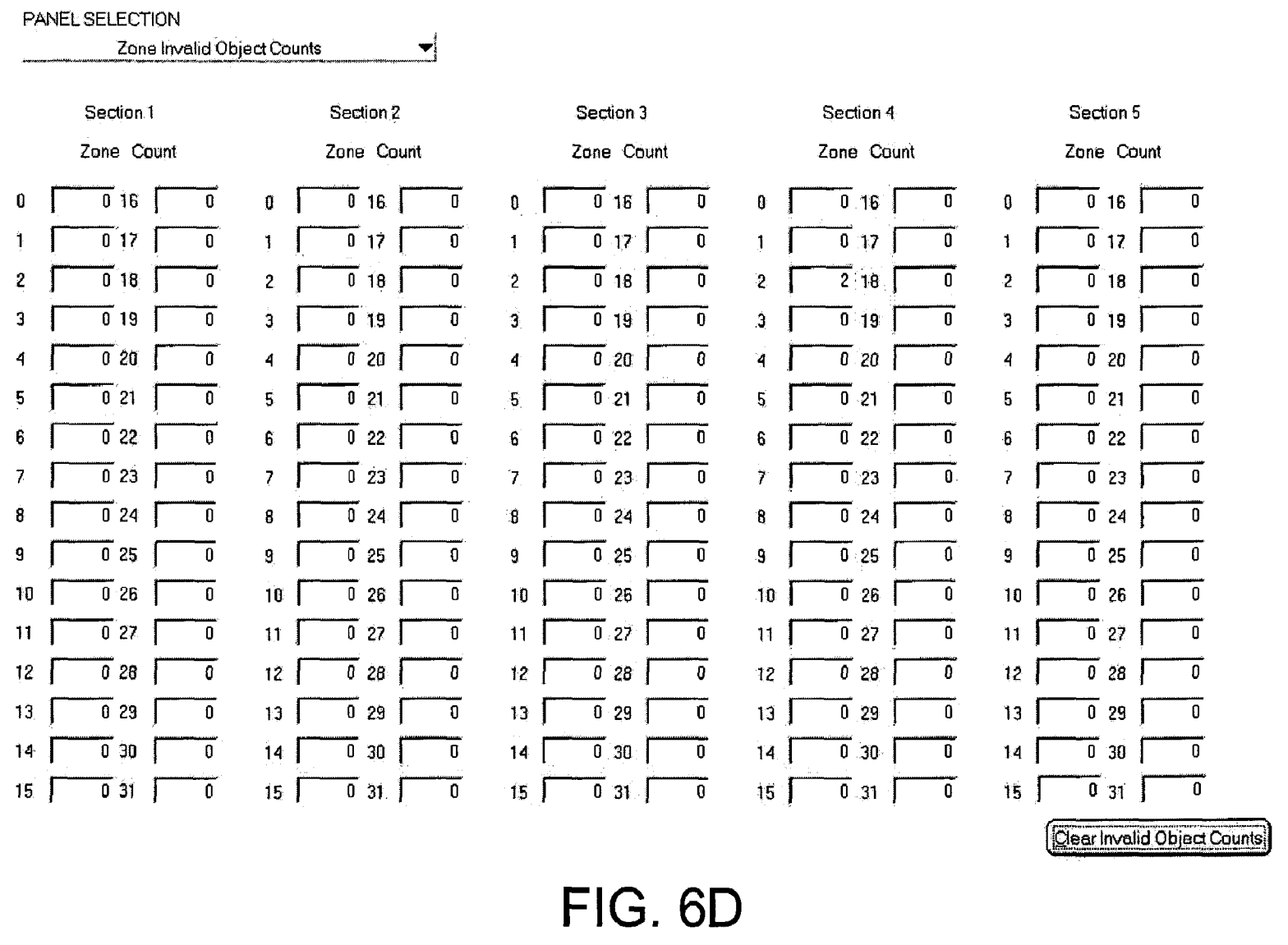

Conversely, if the image is not 'valid' i.e. it is unrecognized as a pill by step 410, then a count for bad images is accumulated. The image is also stored to a bad image buffer at step 414. As pills drop through zones, individual zone counters accumulate the number of invalid pixel images. An invalid pill is defined as a pill whose pixel counts and pixel scans fall outside the valid range as defined to the system. Pixel counts and scans also provide information on the fall time, width and other aspects of the object. A screen illustrating invalid zone counts is illustrated in FIG. 6D and referenced as display 606.

Figure 6E:
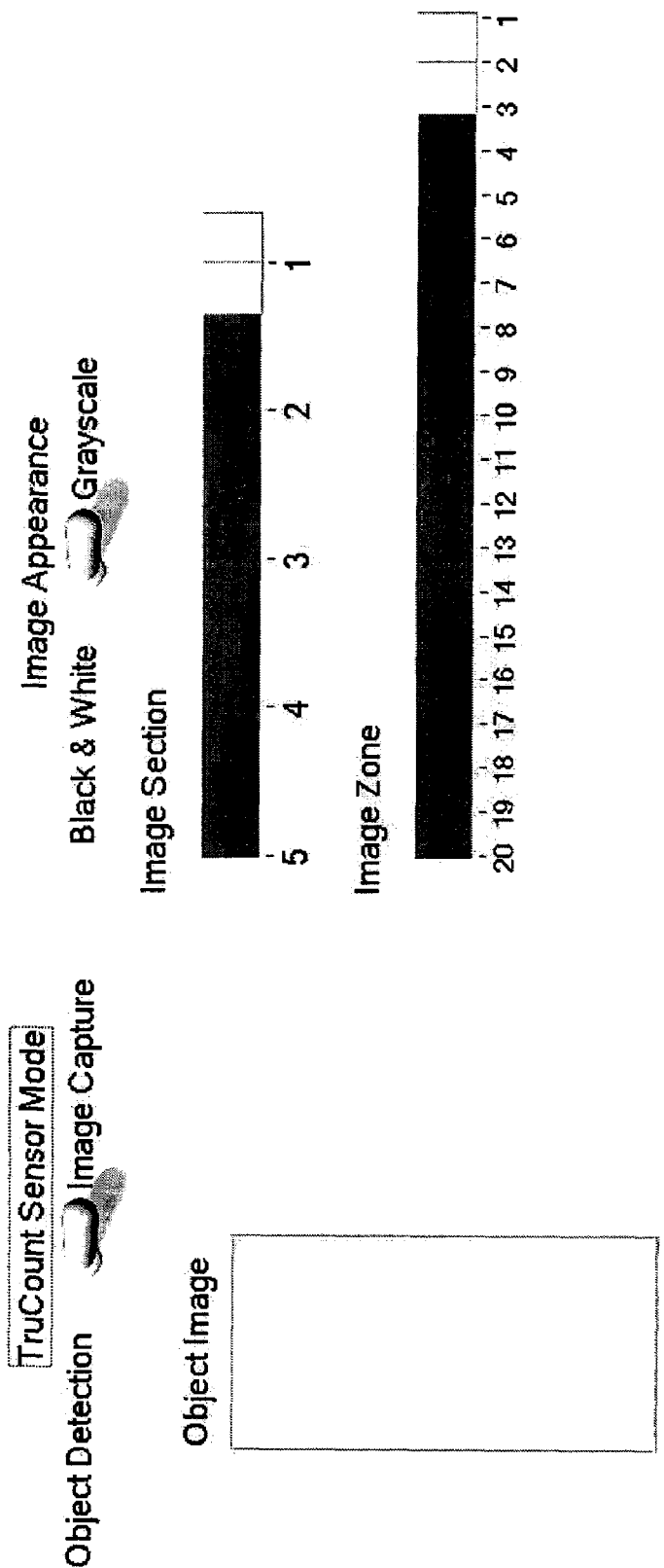
FIG. 6E is a display of a screen for displaying captured pill objects in an embodiment of the present invention.

In conjunction with gathering pixel values, the system and method of the present invention also provides images of the passing pills. The analog values of each pixel may be transferred to an image screen for display as a gray scale image, as illustrated in FIG. 6E. In operation, an operator can select to display the image from a zone within a particular section. Following such selection, the displayed object image for the zone is updated as fast as the objects are counted.

In a further embodiment of the present invention, the acquired images may be utilized to determine the opacity of an object. For example, in a case where the falling objects are capsules, the luminescence of the pixels can be directly correlated to he the opaqueness of the capsule thus indicating whether a capsule is empty or full.

Certain features described thus far are made possible by a number of pre-configured parameters and various settings for the operating environment. FIG. 5 illustrates a screen display 500 in which some of the pre-configuration takes place and various parameters are specified. For example, pixel processor command 502 allows the setup of individual pixels via a communications interface. A command is selected and then the appropriate parameters are supplied in other fields on the screen. A case in point is the setting of the object trigger event 504 that initiates the scanning process.

Various communications modes 504 can be selected for the system. As shown there is an object detection mode, which is the normal operating and pill counting mode. A grayscale diagnostic mode allows zones and dividers to be viewed in real time, thus enabling the appropriate setting of pixels as was earlier described. Binary scan mode displays a full selection of pixels in black and white. Black pixels have levels that exceed the individual pixel thresholds that are defined on the threshold screen of FIG. 6B. Image acquisition allows the zone image of a single tablet to be displayed as the tablet falls through in real time.

A sensor section field 508 allows parameters to be provided for each of the sections in the system. As previously described, there are 5 sections in the preferred embodiment, each being eight inches in length and having 128 pixels. A setup section button 510 allows all sections to be set up with one command.

The zone fields 512 represent the possible zones zero to thirty-one that may exist within each of the five sections. When an object is detected, the system displays the zone, size in number of pixels, and scans—number of scan lines in the object image, and these values are represented in screen area 514. In connection with the object scan and as previously discussed, there are a number of parameters associated with a scanned object that must be satisfied in order for the obtained image to be considered valid. These parameters, minimum and maximum scan lines and minimum and maximum pixel counts are also made accessible through the diagnostic screen 500.

Yet another feature of the present invention is the ability to map bottles. As bottles fall through zones, they are physically shuttled into bottles. Zone mapping is the definition of which zone feed tablets into which bottles. In the described embodiment of the present invention, the slat machine fills twenty bottles at a time. Because there are five sections, each section tracks the filling of four bottles. As such, in each section, zones 1-5 fill bottle number one, zones 6-10 fill bottle number 2, 11-15 fill bottle number 3 and zones 16-20 fill bottle number 4. This ability to map bottles to zones provides the flexibility of the present invention and enables it to adapt to different environments. The system and method of the present invention is able to maintain bottle counts for a vast number of bottles simultaneously. In the preferred embodiment, twenty bottle counts were maintained with the ability to maintain up to approximately fifty bottles.

The details of the processing described above will next be described in reference to a specific embodiment of the present invention utilized for counting pills. In an embodiment of the present invention, a Microchip PIC18F252 processor with a 40.0 MHz oscillator is utilized as the pixel processor 204 for each 1" wide linear array of pixels. A single communications controller processor 208 operates as a slave device to 8 co-operating master pixel processors 204. The controller processor 208 generates a 16 kHz clock pulse utilized to decode 8 pixel conversion and communications states and 4 emitter 122 drive states for the IR emitter LED array.

Each clock pulse starts a two-pixel conversion and evaluation cycle. The eight pixel processors 204 are each allocated one of the eight states for communicating the results of the previous 16 pixel conversions and evaluations to the controller processor 208. Additionally a set of up to thirty-two pixels may be selected from the entire 8-inch linear array to produce grayscale pixel diagnostic data. The selection of the diagnostic pixels is determined by the controller processor and is segmented into multiple 4 contiguous pixel blocks.

The 16 kHz clock produces a 62.5 microsecond window in which two A/D conversions must be completed by each of the 8-pixel processors 204. The pixel processors 204 transmit 8 bytes of data per 62.5 microsecond period in two 4-byte packets. The eight bytes will always consist of 4 bytes of binary scan data for the selected master pixel processor, and four bytes of diagnostic grayscale data from a dynamically selectable block of 4 contiguous pixels anywhere in the 8" array. The slave controller processor 208 thus has the opportunity to transmit up to two 4 byte communications packets on the SPI interface every 62.5 microseconds in response to the master pixel processor 204 data packets.

The A/D converters 202 are connected to the synchronous UART interface of the slave processor 208 and support a clock rate up to 2 MHz. For each conversion the slave processor 208 generates a one-byte A/D control byte and clocks in a one-byte 7-bit conversion result. It takes a minimum of 16 clock states per conversion. Two conversions plus two clock states for miscellaneous control bit updates requires 17 microseconds (34 clock states).

The pixel processor 204 operating at 40.0 MHz executes at 10 million instructions per second. Each instruction takes 100 nanoseconds therefore 625 instructions may be executed per 62.5 microsecond window. In order to communicate 8 bytes of data between the controller processor and the pixel processors 204 it is therefore necessary to communicate a byte every 78 instruction cycles (625/8). The maximum SPI interface rate is 10 MHz, which means it takes a minimum of 8 instruction cycles to transmit and receive a single byte on the SPI interface. At this rate the object detection and pixel counting code must be extremely efficient, and the communications code to interface with adjacent controller processors and the single overall host processor must require minimal overhead. Preferably, the pixel processor 204 sets up the first byte to be transmitted and then utilizes the transmit completion flag to trigger the setup of the subsequent three bytes of the 4 byte packet. To further pipeline the communications performance the 4 byte packet of binary pixel data is transmitted during the 1$^{st}$ A/D conversion process for the current scan and then the 4 byte packet of grayscale diagnostic data is transmitted during the 2$^{nd}$ A/D conversion process.

A pixel processor 204 should detect each high to low transition of the 16 kHz pixel clock input, and then poll the ENB and SYNC inputs to determine the pixel A/D conversion cycle 0-7, and its own processor ID (0-7) used to gate communications packets. Additionally the pixel processor 204 must decode the incoming 4 byte packets to handle selection of diagnostic pixels, setting of grayscale thresholds, establishment of pixel grayscale baseline, and other configuration data.

The timing may be designed to allow the SPI communications to be handled in 4 byte bursts with minimal wasted processor clock cycles to allow as large as possible a code fragment to be executed while not handling communications. It is preferable to limit incoming control packets to the pixel processors 204 to one 4 byte packet per 16 kHz clock period and utilize the other incoming 4 byte packet as a dummy packet.

In a further embodiment of the present invention, it may be desirable to communicate an entire 4 byte SPI packet back and forth between the controller 208 and a pixel processor 204 during the transmission of the control byte to the A/D converters 202. Assuming 8 instructions per SPI byte it requires 32 instruction cycles to transmit the 4 byte packet, the A/D converter clock is 2.0 MHz and thus it takes 40 instruction cycles to transmit a byte to the A/D converter. It may be possible to slightly increase the sample time of the A/D converter 202 and increase the number of clock cycles to slightly more than 40 per control byte to handle master slave synchronization.

During the reception of the A/D result, incoming control packets can be parsed and acted upon. During a subsequent A/D conversion another control packet may be accepted and a 4-byte grayscale diagnostic packet transmitted. Prior to performing A/D conversions at the start of a scan (A/D conversion cycle 0) the grayscale pixel data from the previous scan and buffer the data are evaluated.

It is estimated that Controller Processor 208 to Core Module RS485 Communications would occur at approximately 230 Kbaud.

In the preferred embodiment of the present invention, the following bit maps were implemented in the communication between the Ethernet core processor 210 and the controller processor 208:

1 Byte
  Bit 8—Always '1' to indicate this is from Core to Controller
  Bit 7 . . . 5—Controller Address Bits
  Bit 7 . . . 5=000 Data Nibble to previously addressed Controller(s)
    001 Start of message to Controller 1, or Immediate Command
    010 Start of message to Controller 2, or Immediate Command
    011 Start of message to Controller #3, or Immediate Command
    100 Start of message to Controller #4, or Immediate Command
    101 Start of message to Controller #5, or Immediate Command
    110 Undefined
    111 Broadcast address, Start of message or Immediate Command to All Controller's
  Bit 4—Start of Message Flag
  Bit 4=1 Start of Message
    0 Immediate Command or Packet Data Nibble
  Bit 3 . . . 0—Nibble Count, Immediate Command, Packet Data Nibble
    Bit 3 . . . 0—Nibble Count if Bit 4 Start of Message Flag is '1'
    Bit 3 . . . 0—Packet Data Nibble if Bits 7 . . . 4='0000'
    Bit 3 . . . 0—Immediate Commands if Bit 4 Start of Message Flag is '0' And Bits 7 . . . 5 <> '000'
    Bit 3 . . . 0=0000 Sleep Mode, no communications
      0001 Object Detect Mode
      0010 Idle Mode(Pixels 0-7)
      0011 Idle Mode(Pixels 8-15)
      0100 Self Test Mode, Clear Bit Status(failure bits are sticky)
      0101 Self Test Mode(Pixels 0-7)
      0110 Self Test Mode(Pixels 8-15)
      1000 Diagnostic Grayscale Mode(Diagnostic ID 0/1 Data)
      1001 Diagnostic Grayscale Mode(Diagnostic ID 2/3 Data)
      1010 Diagnostic Grayscale Mode(Diagnostic ID 4/5 Data)
      1011 Diagnostic Grayscale Mode(Diagnostic ID 6/7 Data)

Packet Messages
  Nibble 1—Packet ID
    0000—Lo Threshold Value
    0001—Hi Threshold Value
    0010—Self Test Lo Threshold Value
    0011—Self Test Hi Threshold Value
    0100—Zone Mapping, Each pixel is identified by a Zone ID 0-31
    0101—Min Object size in pixels
    0110—Maximum Object size in pixels
    0111—Diagnostic Mapping (always use broadcast)
  Nibble 2—Processor Address, 0-7
  Nibble 3—Pixel Address, 0-15
  Nibble 4—Diagnostic ID, 0-7 for diagnostic data selection
  Nibble 6 . . . 5—Data Value or Zone ID
  Zone 32-63 is considered Zone 32 and passed to adjacent Controller Zone 0
  Zone 128-255 marks a disabled pixel and is not evaluated, used for dividers In the preferred embodiment of the present invention the following bit maps were implemented in the communication between the controller processor 208 and the Ethernet core processor 210:

8 Bytes
  Bit 8—Always '0' to indicate this is from Controller to Core
  Bit 7 . . . 0—Data 8-bit
  Diagnostic Grayscale Data, 4 packets requested round robin fashion per Controller
    Bytes 8 . . . 1 Pixel Grayscale Data (pixels selected by Immediate Command)
    Object Data,
    Byte 1—Zone 0-31
    Byte 2—Status(Good object, Undersize, Oversize)
    Byte 3—Scans(0-256)
    Byte 5 . . . 4—Pixels(0-65536)
    Byte 8 . . . 6—Unused all '0's Self Test Data, 2 packets requested round robin fashion
Byte 1—Pixel Processor 0 Pass/Fail Bits
    Bit 7 . . . 0 Pixel Pass/Fail Status 0=Pass, 1=Fail
Byte 2—Pixel Processor 1 Pass/Fail Bits
Byte 3—Pixel Processor 2 Pass/Fail Bits
Byte 4—Pixel Processor 3 Pass/Fail Bits
Byte 5—Pixel Processor 4 Pass/Fail Bits
Byte 6—Pixel Processor 5 Pass/Fail Bits
Byte 7—Pixel Processor 6 Pass/Fail Bits
Byte 8—Pixel Processor 7 Pass/Fail Bits
Idle Data, 2 packets requested round robin fashion
Byte 1—Pixel Processor 0 Black/White Bits
    Bit 7 . . . 0 Pixel Black/White Status 0=White, 1=Black
Byte 2—Pixel Processor 1 Black/White Bits
Byte 3—Pixel Processor 2 Black/White Bits
Byte 4—Pixel Processor 3 Black/White Bits
Byte 5—Pixel Processor 4 Black/White Bits
Byte 6—Pixel Processor 5 Black/White Bits
Byte 7—Pixel Processor 6 Black/White Bits
Byte 8—Pixel Processor 7 Black/White Bits It is necessary that there is time synchronization between the controllers 208 for pixel sharing. Each controller 208 has two 3 pin TTL level output connectors for pixel and timing synchronization. The #1 Controller generates a 16 kHz pixel clock, which is output on the 3-pin Pixel Sharing Output connector along with a Shared Pixel Data output and Ground signal.

Subsequent controllers detect transitions of the pixel clock signal and sense the Shared Pixel Data state on the 3-pin Pixel Sharing Input connector. The controller uses the 16 kHz clock input to shift in up to 8 shared pixels and to synchronize its timing with the previous controller. The subsequent controller produces the same pixel and timing synchronization signals on its 3-pin Pixel Sharing Output connector. A continuous timing synchronization chain is formed between the five co-operating controllers using this mechanism.

Low to High transitions on the clock output are detected to establish timing synchronization, and High to Low transitions on the clock output are used to sample the shared pixel data states. If a break in the timing chain is likely or anticipated it would be possible to connect the five controllers in a star configuration instead of daisy chained.

Importantly, timing synchronization must be maintained between all the processors and the emitter drive pattern generated by controller #1. This is accomplished by superimposing a sync pulse onto the pixel data during the clock High state. The pixel data signal would by default be set low during the clock High state and then revert to the pixel data state prior to the High to Low transition of the clock used to sample the pixel data. The data line would be set High only on the first ADC conversion cycle of the current scan and sampled during the clock High state to control state synchronization. The slaved controller 208 must be able to detect the Low to High transition of the 16 kHz clock signal and adjust its timing accordingly to limit the time difference between the reference clock and the internally generated clock to 5-10 instruction cycles. Writing a temporary new PR2 register value allows the 16 kHz clock period to be varied on the fly to adjust the timing in small increments. Using the incoming clock to generate interrupts on RB0 at high priority and then reading TMR2 allows the synchronization to be measured given a known fixed interrupt latency. PR2 is then updated for the next cycle based on the timing measurement.

The various features and screen examples shown and discussed above illustrate the novel features of the counting system of the present invention. A user of the present invention may choose any of the above features or an equivalent thereof, depending upon the desired application. In this regard, it is recognized that various forms of the subject systems could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An optical system for identifying one or more objects, comprising:
   a light source array;
   an array of photo detectors;
   means for reconfigurably grouping said light source array and said array of photo detectors into at least two zones;
   means for rapidly strobing said light source array and scanning said photo detectors within each of said zones to capture a plurality of data values as one or more target objects pass through said zones;
   means for producing a capture image of said target objects utilizing said data values; and
   means for utilizing said capture image to identify said objects.

2. A system as recited in claim 1 further comprising means for accumulating counts of identified objects.

3. A system as recited in claim 1 further comprising means to determine opacity of said one or more target objects.

4. A system as recited in claim 1, wherein identifying includes comparing said objects with known objects, utilizing size and pixel luminance.

5. A system as recited in claim 1, wherein said capture image is displayed to an operator for identification.

6. A system as recited in claim 1, wherein said plurality of data values comprise:
   an analog signal value from said array of photo detectors;
   a gray scale converted from said analog signal value; and
   one or more data bits corresponding to said gray scale.

7. A system for counting objects, comprising:
   a wide linear array of pixels, wherein said array of pixels includes one or more sections, each of said sections having a predetermined number of individual pixels equally spaced, and wherein each pixel is reconfigurably grouped into one of at least two zones;
   a pixel processor coupled to each pair of pixels, wherein said pixel processors are grouped into a section, said section providing a state that correspond to values of individual pixels;
   said section having a communications processor, said communications processor receiving information from each of said pixel processors within said section, wherein said pixel processors within a section are synchronized;
   a network processor providing the interface between said communication processor and an application program that receives scan data and pixel counts.

8. A system as recited in claim 7 wherein said identifying comprises:
   comparing each pixel in said capture image with a threshold value to determine a count of valid pixels; and
   obtaining a count of scan lines in said capture image.

9. A system as recited in claim 8, wherein said count of valid pixels and said count of scan lines are utilized to provide dimensions of said falling object.

10. A system as recited in claim 8, wherein said count of valid pixels and said count of scan lines are utilized to provide fall time information said falling object.

11. A method in a computing system for counting a falling object passing between a light source and a plurality of photo detectors, comprising:
   reconfigurably grouping said plurality of photo detectors into one or more counting zones;
   repeatedly scanning said counting zones for a capture image of said falling object;
   identifying said capture image; and
   including the falling object in a count if the capture image is identified.

12. A method as recited in claim 11 further comprising, comparing said capture image with a known image by comparing said count of valid pixels and said count of scan lines in said capture image with a number of valid pixels and a number of scan lines for a known image.

13. A method as recited in claim 12, wherein said number of valid pixels and said number of scan lines for a known image are obtained during execution in a diagnostic mode.

14. A method as recited in claim 12 further comprising maintaining simultaneous counts for multiple receptacles of said falling objects.

15. A computer readable medium having computer executable instructions for counting a falling object passing between a light source and a plurality of photo detectors, comprising:
   reconfigurably grouping said plurality of photo detectors into one or more counting zones;
   repeatedly scanning said counting zones for a capture image of said falling object;
   identifying said capture image; and
   including the falling object in a count if the capture image is identified.

16. A computer system having a processor, a memory and an operating environment, the computer system operable to execute instructions for counting a falling object passing between a light source and a plurality of photo detectors, comprising:
   reconfigurably grouping said plurality of photo detectors into one or more counting zones;
   repeatedly scanning said counting zones for a capture image of said falling object;
   identifying said capture image; and
   including the falling object in a count if the capture image is identified.

17. A method for analyzing a scanned object image having a plurality of pixels, comprising:
   reconfigurably grouping said plurality of pixels into one or more counting zones;
   providing a value for each of said plurality of pixels; and
   comparing each of said pixel values against a threshold value to produce a grayscale image of the scanned object,
   wherein said value represents the degree of luminance of said pixel.

18. A computer system having a processor, a memory and an operating environment, the computer system operable to execute instructions for analyzing a scanned object image having a plurality of pixels, comprising:
   reconfigurably grouping said plurality of pixels into one or more counting zones;
   providing a value for each of said plurality of pixels; and
   comparing each of said pixel values against a threshold value to produce a grayscale image of the scanned object,
   wherein said value represents the degree of luminance of said pixel.

19. A computer readable medium having computer executable instructions for analyzing a scanned object image having a plurality of pixels, comprising:
   reconfigurably grouping said plurality of pixels into one or more counting zones;
   providing a value for each of said plurality of pixels; and
   comparing each of said pixel values against a threshold value to produce a grayscale image of the scanned object,
   wherein said value represents the degree of luminance of said pixel.

* * * * *